G. S. NICHOLS.
WHEELBARROW.
APPLICATION FILED JUNE 15, 1914.

1,154,536.

Patented Sept. 21, 1915.

Witnesses

Inventor
G. S. Nichols,
By
Attorney

UNITED STATES PATENT OFFICE.

GEORGE S. NICHOLS, OF FREEPORT, MAINE.

WHEELBARROW.

1,154,536.　　　　Specification of Letters Patent.　　Patented Sept. 21, 1915.

Application filed June 15, 1914.　Serial No. 845,273.

*To all whom it may concern:*

Be it known that I, GEORGE S. NICHOLS, a citizen of the United States, residing at Freeport, in the county of Cumberland and State of Maine, have invented certain new and useful Improvements in Wheelbarrows; and I do hereby declare the following to be a full, clear, and exact description of the invention, such as will enable others skilled in the art to which is appertains to make and use the same.

This invention relates to reinforced springs for wheel barrows, and one of the principal objects of the invention is to provide a spring to be interposed between the front ends of the side bars of the barrow and the pintles on the end of the axle of the wheel, so that there will be a spring action to the barrow to relieve the operator from the entire weight of the load.

Another object of the invention is to mount the front portion of the load on a spring at opposite sides of the box to render the barrow easy in operation.

Figure 1:
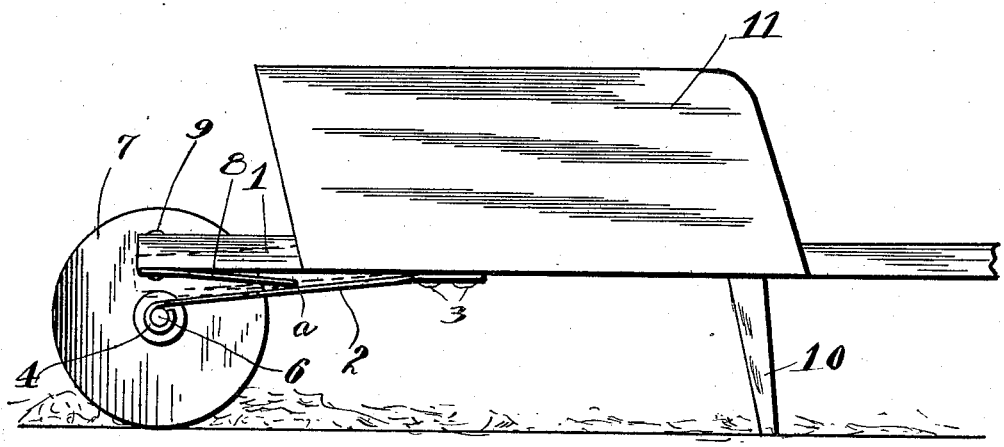
Figure 2:
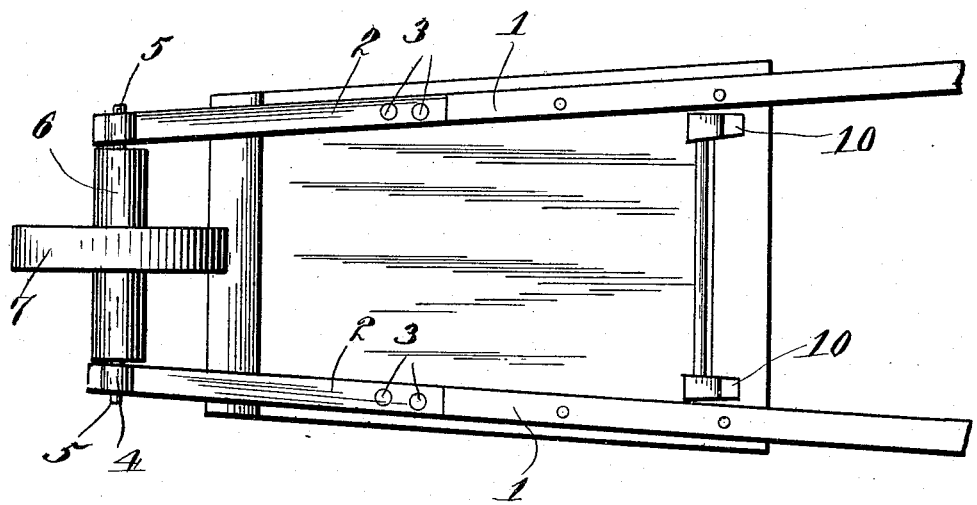

These and other objects may be attained by means of the construction illustrated in the accompanying drawing, in which, Figure 1 is a side elevation of a wheel barrow provided with this improvement, and Fig. 2 is a bottom plan view of the same.

Referring to the drawing, the numeral 1 designates the side bars of the barrow frame which converge toward the front and are provided with suitable handles at the rear. Bolted to the underside of the side bars 1 near the front ends thereof are flat sheet metal springs 2, said springs being bolted at 3 and the front ends of said springs being formed into pintle bearings 4 for the reduced ends 5 of the axle 6, on which the wheel 7 is mounted.

For giving the spring 2 upon opposite sides of the axle sufficient stability and resiliency for the purpose, a second spring 8 is secured by means of a bolt 9 at the ends of the side bars 1, said springs extending backward and bent away from the lower side of the side bars 1, as shown in Fig. 1, to bear upon the upper side of the spring 2 at a point about midway the length of said spring, said point being indicated by the letter *a* in Fig. 1.

From the foregoing it will be obvious that the wheel 7 being mounted upon spring bearings that when the handles at the ends of the side bars 1 are lifted to raise the stilts 10, the load in the box 11 will be thrown toward the front upon the springs 2 and 8 and will thus relieve the operator of the barrow from the entire weight and will make the barrow run much easier.

Various changes may be made in the details of construction without departing from the spirit and scope of the invention as defined in the claims.

What is claimed is:—

1. The combination with a wheelbarrow having side bars, of a pair of flat sheet metal springs secured to the under sides of the bars between the ends of the latter, the free ends of said springs being formed into pintle bearings for the pintles of the wheel, a second pair of springs secured to the front ends of the side bars their free ends extending downwardly and resting upon the upper face of the first mentioned springs intermediate their ends forming a compound spring for the barrow when in use.

2. The combination with a wheelbarrow, of a pair of flat springs secured to the side bars intermediate their ends, the free ends formed into bearings adapted to be secured around the pintles of the wheel and disposed on opposite sides thereof, a second pair of springs rigidly secured to the ends of said bars their free ends extending inwardly and downwardly and resting upon the upper face of the first mentioned springs adapted to form a compound spring for the barrow when in use.

In testimony whereof I affix my signature in presence of two witnesses.

GEORGE S. NICHOLS.

Witnesses:
 MINERVA B. GAMMAN,
 WILSON N. GRANT.

Copies of this patent may be obtained for five cents each, by addressing the "Commissioner of Patents, Washington, D. C."